US00RE44664E

(19) United States
(12) Reissued Patent
McColloch

(10) Patent Number: US RE44,664 E
(45) Date of Reissued Patent: Dec. 24, 2013

(54) MULTI-OPTICAL FIBER CONNECTOR MODULE FOR USE WITH A TRANSCEIVER MODULE AND METHOD FOR COUPLING OPTICAL SIGNALS BETWEEN THE TRANSCEIVER MODULE AND MULTIPLE OPTICAL FIBERS

(75) Inventor: Laurence Ray McColloch, Santa Clara, CA (US)

(73) Assignee: Avago Technologies General IP (Singapore) Pte. Ltd., Singapore (SG)

(21) Appl. No.: 13/476,236

(22) Filed: May 21, 2012

Related U.S. Patent Documents

Reissue of:
(64) Patent No.: 7,543,994
Issued: Jun. 9, 2009
Appl. No.: 11/683,118
Filed: Mar. 7, 2007

U.S. Applications:
(60) Provisional application No. 60/862,200, filed on Oct. 19, 2006.

(51) Int. Cl.
*G02B 6/36* (2006.01)

(52) U.S. Cl.
USPC ..... 385/89; 385/92; 385/93; 385/115

(58) Field of Classification Search
USPC ..... 385/89–93, 134–137
See application file for complete search history.

(56) References Cited

U.S. PATENT DOCUMENTS

| | | | |
|---|---|---|---|
| 4,421,383 | A | 12/1983 | Carlsen |
| 4,826,272 | A | 5/1989 | Pimpinella et al. |
| 4,836,637 | A | 6/1989 | Poorman et al. |
| 4,913,510 | A | 4/1990 | Lynch et al. |
| 5,325,455 | A | 6/1994 | Henson et al. |
| 5,515,468 | A | 5/1996 | DeAndrea et al. |
| 5,708,743 | A | 1/1998 | DeAndrea et al. |
| 5,892,872 | A | 4/1999 | Glover |
| 6,040,934 | A | 3/2000 | Ogusu et al. |
| 6,259,856 | B1 | 7/2001 | Shahid |
| 6,272,272 | B1 | 8/2001 | Ford |
| 6,282,000 | B1 | 8/2001 | Kikuchi et al. |

(Continued)

FOREIGN PATENT DOCUMENTS

| | | |
|---|---|---|
| CN | 2136989 | 6/1993 |
| CN | 1221117 | 6/1999 |

(Continued)

OTHER PUBLICATIONS

Satake, T. et al. "MT Multifiber Connectors and New Applications". IEEE Proceedings, 1994, pp. 994-999.

*Primary Examiner* — Eric Wong

(57) ABSTRACT

A multi-fiber connector module for optical communications is provided that receives collimated beams of light from a transceiver module and focuses the collimated beams to respective focal points that coincide with the ends of respective transmit fibers. Because the inputs to the connector module are collimated light beams, movements of one or more parts of the connector and/or transceiver module will not result in optical losses as long as the movements are not so great as to prevent the collimated light beams from falling fully on the lenses of the optics system of the connector module. The lenses then focus the collimated light beams onto the ends of the transmit fibers.

33 Claims, 15 Drawing Sheets

(56) References Cited

U.S. PATENT DOCUMENTS

| | | | | |
|---|---|---|---|---|
| 6,328,484 | B1 | 12/2001 | Uebbing | |
| 6,434,308 | B1 | 8/2002 | Trezza | |
| 6,434,315 | B1 | 8/2002 | Grois et al. | |
| 6,491,447 | B2 | 12/2002 | Aihara | |
| 6,526,204 | B1 | 2/2003 | Sherrer et al. | |
| 6,574,107 | B2 | 6/2003 | Jeon et al. | |
| 6,587,421 | B1 | 7/2003 | Wilde et al. | |
| 6,636,540 | B2 | 10/2003 | Uebbing | |
| 6,668,113 | B2 | 12/2003 | Togami et al. | |
| 6,751,379 | B2 | 6/2004 | Capewell et al. | |
| 6,759,687 | B1 | 7/2004 | Miller et al. | |
| 6,782,181 | B2 | 8/2004 | Tourne | |
| 6,821,027 | B2 | 11/2004 | Lee et al. | |
| 6,860,648 | B2 | 3/2005 | Jin et al. | |
| 6,869,232 | B2 | 3/2005 | Schunk et al. | |
| 6,901,185 | B2 | 5/2005 | Sasaki et al. | |
| 6,953,291 | B2 | 10/2005 | Liu | |
| 7,021,833 | B2 | 4/2006 | Loh et al. | |
| 7,048,449 | B2 | 5/2006 | Frojdh et al. | |
| 7,109,524 | B2 | 9/2006 | Killer | |
| 7,137,746 | B2 | 11/2006 | Kato | |
| 7,197,224 | B2 | 3/2007 | Rolston et al. | |
| 7,220,065 | B2 | 5/2007 | Han et al. | |
| 7,228,020 | B2 | 6/2007 | Weigert | |
| 7,248,768 | B2 | 7/2007 | Jeon et al. | |
| 7,287,914 | B2 | 10/2007 | Fujiwara et al. | |
| 7,331,720 | B1 | 2/2008 | McColloch | |
| 7,534,052 | B2 | 5/2009 | Fujiwara et al. | |
| 7,553,091 | B2 | 6/2009 | McColloch | |
| 7,726,885 | B2 | 6/2010 | Nishimura et al. | |
| 7,918,610 | B2 | 4/2011 | Fujiwara et al. | |
| 8,002,477 | B2 | 8/2011 | Colgan et al. | |
| 2003/0072538 | A1* | 4/2003 | Jin et al. | 385/89 |
| 2003/0091301 | A1 | 5/2003 | Lee et al. | |
| 2004/0028315 | A1 | 2/2004 | Weigel | |
| 2004/0061956 | A1 | 4/2004 | Schunk et al. | |
| 2005/0018993 | A1 | 1/2005 | Rolston et al. | |
| 2005/0141823 | A1* | 6/2005 | Han et al. | 385/89 |
| 2005/0259927 | A1* | 11/2005 | Kato | 385/93 |
| 2007/0077008 | A1* | 4/2007 | Jeon et al. | 385/49 |
| 2008/0095502 | A1 | 4/2008 | McColloch | |
| 2008/0282742 | A1* | 11/2008 | Colgan et al. | 65/406 |
| 2010/0135618 | A1 | 6/2010 | Howard et al. | |

FOREIGN PATENT DOCUMENTS

| | | |
|---|---|---|
| CN | 1232973 | 10/1999 |
| CN | 1244928 | 2/2000 |
| CN | 1545632 | 11/2004 |
| JP | 2004-212847 | 7/2004 |
| WO | WO 2004/097481 | 11/2004 |

* cited by examiner

MULTI-OPTICAL FIBER CONNECTOR MODULE FOR USE WITH A TRANSCEIVER MODULE AND METHOD FOR COUPLING OPTICAL SIGNALS BETWEEN THE TRANSCEIVER MODULE AND MULTIPLE OPTICAL FIBERS

Matter enclosed in heavy brackets [ ] appears in the original patent but forms no part of this reissue specification; matter printed in italics indicates the additions made by reissue.

CROSS-REFERENCE TO RELATED APPLICATIONS

This application claims priority to U.S. Provisional Application Ser. No. 60/862,200, entitled "TRANSCEIVER AND CONNECTOR", filed on Oct. 19, 2006, which is incorporated herein by reference in its entirety.

TECHNICAL FIELD OF THE INVENTION

The invention relates to optical communications. More particularly, the invention relates to a multi-fiber connector module that couples light between elements of a transceiver module and ends of optical fibers in the connector module.

BACKGROUND OF THE INVENTION

FIG. 1 illustrates a block diagram of a transceiver module 2 currently used in optical communications. The transceiver module 2 includes a transmitter portion 3 a receiver portion 4. The transmitter and receiver portions 3 and 4 are controlled by a transceiver controller 6. The transmitter portion 3 comprises components for transmitting data in the form of amplitude modulated optical signals over multiple fibers (not shown). The transmitter portion includes a laser driver 11 and a plurality of laser diodes 12. The laser driver 11 outputs electrical signals to the laser diodes 12 to modulate the laser diodes 12, thereby causing them to output optical signals that have power levels corresponding to logic 1s and logic 0s. An optics system (not shown) of the transceiver module 2 focuses the coherent light beams produced by the laser diodes 12 into the ends of respective transmit optical fibers (not shown) held within a connector (not shown) that mates with the transceiver module.

A plurality of monitor photodiodes 14 monitor the output power levels of the respective laser diodes 12 and produce respective electrical analog feedback signals that are delivered to an analog-to-digital converter (ADC) 15, which converts that electrical analog signals into digital signals. The digital signals are input to the transceiver controller 6, which processes them to obtain respective average output power levels for the respective laser diodes 12. The controller 6 outputs controls signals to the laser driver 11 to cause it to adjust the respective bias current signals output to the respective laser diodes 12 such that the average output power levels of the laser diodes are maintained at relatively constant levels.

The receiver portion 4 includes a plurality of receive photodiodes 21 that receive incoming optical signals output from the ends of respective receive optical fibers (not shown) held in the connector referred to above that mates with the transceiver module. An optics system (not shown) of the receiver portion 4 focuses the light output from the ends of the receive optical fibers onto the respective receive photodiodes 21. The connector may include an optics system that focuses light from the ends of the receive fibers onto the optics system of the receive portion of the transceiver module, which then focuses the light onto the photodiodes. The receive photodiodes 21 convert the incoming optical signals into electrical analog signals. An ADC 22 converts the electrical analog signals into electrical digital signals suitable for processing by the transceiver controller 6. The transceiver controller 6 processes the digital signals to recover the data represented by the signals.

FIG. 2A illustrates a perspective view of a known multi-fiber connector module 31 designed for use with a transceiver module of the type described above with reference to FIG. 1. This connector module 31 is manufacture by US Conec Ltd. of Hickory, N.C. and has become known in the optical fiber connector industry as the MTP® connector. The connector module 31 holds ends of the transmit and receive fibers and has an optics system that couples light from the laser diodes 12 into the ends of transmit fibers and from the ends of the receive fibers onto the photodiodes 21. The connector module 31 receives a duplex fiber ribbon (transmit and receive fibers) 32 having a total of 4, 8, 12 or 24 optical fibers. A strain relief device 33 holds the fibers grips the fibers below the ends to prevent the fiber ends from moving in the event that mechanical loading on the cable occurs due to tugging or pulling of the cable. This prevents the integrity of the optical signals from being degraded due to a problem referred to in the optical communications industry as "wiggle" or "wiggle losses".

The connector module 31 has an outer housing 34 and an inner housing 35. The inner housing has latching elements 36 thereon for securing the module 31 to a receptacle 61 of a transceiver module. A collar 31 surrounds the outer housing 34 of the connector module 31 and prevents the latching elements 36A and 36B from unlatching when the connector module 31 is connected to the transceiver module receptacle 61. The ends of the transmit and receive fibers are held within a multi-fiber ferrule 37 that extends slightly beyond the end 38 of the inner housing 35. The ends (not shown) of the fibers are polished and extend a very small distance beyond the end of the ferrule 38 such that the polished end of each fiber provides a flat optical element for coupling light between the polished end and an optical element (not shown) of the receptacle 61.

FIG. 2B illustrates a cutaway view of the MTP connector module 31 shown in FIG. 2A that reveals features inside of the connector module 31 and receptacle 61. Inside of the inner housing 35, the ferrule 37 is moveably secured and spring-loaded to allow it to move in the axial direction of the fibers. A spring (not shown) is located in the cylindrical groove 42 formed in the inner housing 35 of the connector module 31. When the connector module 31 is latched to the receptacle 61, the outer end 37A of the ferrule 37 is in abutment with the contact surface (not shown) of the receptacle 61. This contact surface of the receptacle 61 contains optical elements (not shown), which will be described below in more detail with reference to FIG. 2C. The abutment of the ferrule end 37A with this contact surface of the receptacle 61 exerts a force on the end 37A of the ferrule 37 in the axial direction of the fibers that causes the end 37B of the ferrule to press against and thereby compress the spring to allow the ferrule 37 to retract into the inner housing 35 of the connector module 31. The ferrule 37 retracts until the ferrule end 37A is flush with the end 38 of the inner housing 35. This abutment of the ferrule end 37A against the contact surface of the receptacle 61 ensures that the flat optical elements comprising the polished ends of the fibers are in contact with the optics elements contained in the contact surface, which ensures efficient optical coupling.

FIG. 2C illustrates a cutaway view of the MTP connector module 31 shown in FIG. 2B with the connector module 31 connected to the receptacle 61. Only one side of the ferrule 37 is shown in FIG. 2C. The ferrule 37 has a cylindrical opening 37C formed in the left side thereof and a cylindrical opening (not shown) formed in the right side thereof for receiving cylindrical pins 62A and 62B that extend from the contact surface 63 of the receptacle 61 for guiding and alignment. The fibers (not shown) are positioned in respective grooves 41 formed in the ferrule 37 and secured thereto by an adhesive material. Latching elements 64A and 64B of the receptacle 61 engage latching elements 36A and 36B to lock the connector module 31 to the receptacle 61. The collar 31 is in sliding engagement with the outer housing of the connector module 31 and has an inner surface 39 that presses against the latching elements 64A and 64B to prevent them from disengaging from the latching elements 36A and 36B. This tight physical coupling and precision alignment of the connector module 31 and the receptacle 61 results in tight optical alignment, which, in turn, results in low optical losses and good signal integrity.

The MTP connector module 31 has been widely adopted due to its low wiggle loss, high optical coupling efficiency and high manufacturing yield. One of the disadvantages of the MTP connector module 31 is that it is relatively expensive due to the fact that the ends of the fibers must be polished and due to the fact that the parts must be manufactured with extremely high precision in order to achieve precise physical and optical alignment. Because of the precision with which physical alignment must be maintained in order to achieve the necessary optical coupling efficiency, any reduction in part precision will result in unacceptable optical losses. Attempts have been made to use cleaved fiber ends in the MTP connector module, but such attempts generally have been unsuccessful because they result in the connector modules having inconsistent optical coupling losses.

A multi-fiber connector known in the optical fiber connector industry as the PT connector module that uses cleaved fiber ends has been proposed. In the proposed PT connector module, the cleaved ends of the fibers are guided into V-grooves formed in the connector module and secured therein with a refractive index matching epoxy. FIG. 3 illustrates the optical path taken by light output from a VCSEL laser 71 of the transceiver module (not shown) as the light passes through the transceiver receptacle and is focused onto the end of a transmit fiber in the PT connector module. The light passes through a conventional lens 72 of the transceiver module, which produces a focused beam of light that is folded by a folding mirror 73 of the connector module such that the focal point of the focused beam coincides with the end 74 of a transmit fiber 75.

Although the PT connector module has a reduced cost associated with using cleaved fibers instead of polished fibers, like the MTP connector module, the parts of the PTC connector module must be made with extremely high precision in order to ensure low wiggle loss and low optical loss due to other factors, such as parts moving by unequal amounts as the temperature varies due to differences in the coefficients of thermal expansion (CTE) of the various parts. This movement can cause optical misalignment, which results in optical losses along the optical path.

It would be desirable to provide a multi-fiber connector module that can be made with reduced cost by using cleaved fibers instead of polished fibers and that can be made with less expensive parts without sacrificing performance or manufacturing yield.

SUMMARY OF THE INVENTION

The invention provides a multi-optical fiber connector module comprising a connector module housing and an optics system. The connector module housing has one or more locking mechanisms configured to interlock with one or more locking mechanisms of a transceiver module housing to place the connector module in locking engagement with a transceiver module. The optics system has one or more optical components configured to receive a plurality of collimated light beams from a transceiver module when the connector module is in locking engagement with a transceiver module. The optical components focus each of the collimated light beams into an end of a respective transmit optical fiber. The ends of the transmit optical fibers are cleaved and secured to the optics system of the connector module.

The invention also provides a method for coupling collimated light beams output from a transceiver module into ends of optical fibers secured to an optics system of a multi-optical fiber connector module. The method comprises receiving the collimated light beams output from a transceiver module with one or more optical components of the optics system of the multi-optical fiber connector module, and, with the optical components, focusing each of the collimated light beams to focal points that coincide with the ends of respective transmit optical fibers. The ends of the transmit optical fibers are cleaved and secured to the optics system of the connector module.

These and other features and advantages of the invention will become apparent from the following description, drawings and claims.

DETAILED DESCRIPTION OF AN ILLUSTRATIVE EMBODIMENT

In accordance with the invention, a connector module is configured to provide tight mechanical and optical coupling with the transceiver module with which it is designed to mate. The tight mechanical coupling prevents or minimizes relative movement between the connector and transceiver modules. By reducing relative movement between the connector and transceiver modules, it is ensured that the optics systems of the transceiver and connector modules will remain in optical alignment even if forces are exerted on one or both of the modules. The fiber ends held in the connector module are cleaved and are covered in a refractive index matching epoxy. A short distance away from the fiber ends, the fibers are held by a strain relief mechanism to prevent external forces exerted on the fibers from being translated to the fiber ends.

Figure 1:
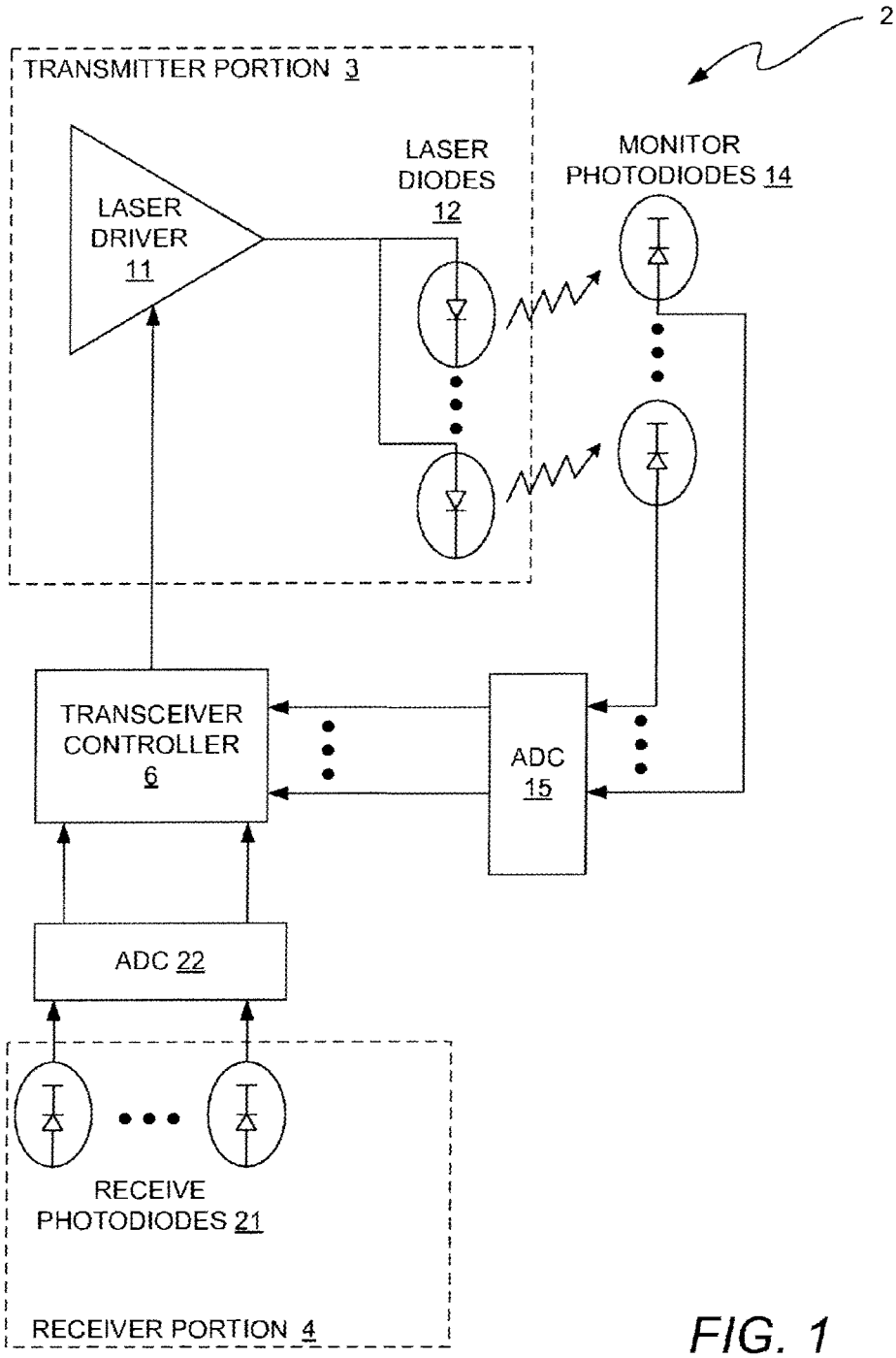
FIG. 1 (PRIOR ART)
FIG. 1 illustrates a block diagram of a known transceiver module currently used in optical communications.
Figure 2A:
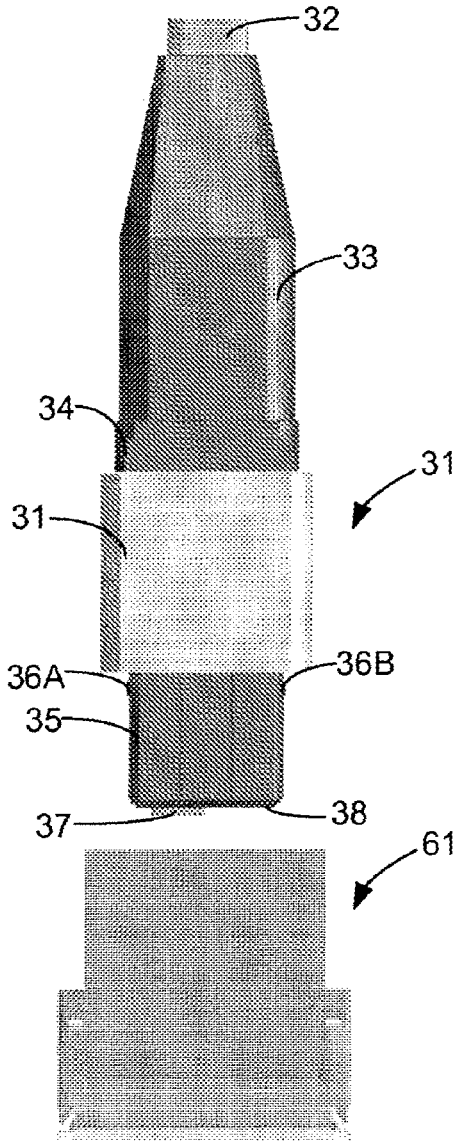
FIG. 2A (PRIOR ART)
FIG. 2A illustrates a three dimensional (3-D) top view of a known multi-fiber connector module designed for use with a transceiver module of the type described above with reference to FIG. 1.
Figure 2B:
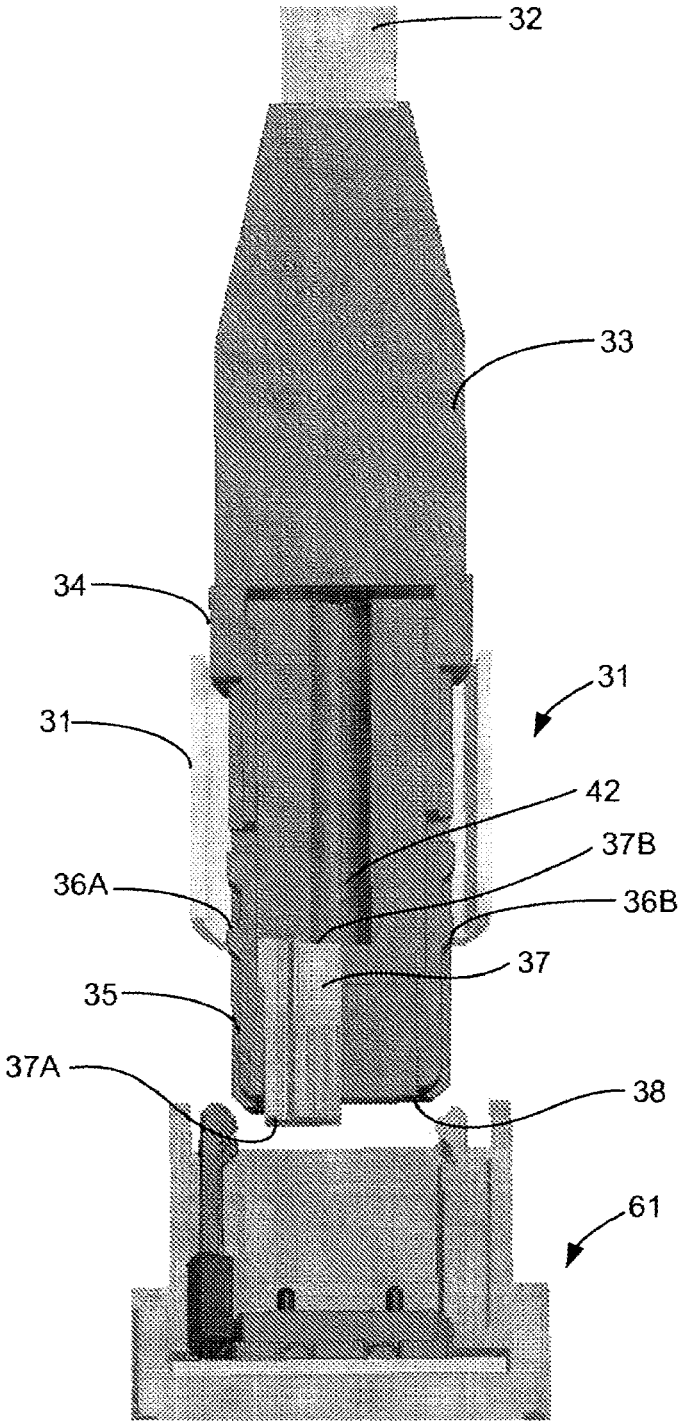
FIG. 2B (PRIOR ART)
FIG. 2B illustrates a 3-D cutaway view of the MTP connector module shown in FIG. 2A that reveals features inside of the connector module and transceiver receptacle.
Figure 2C:
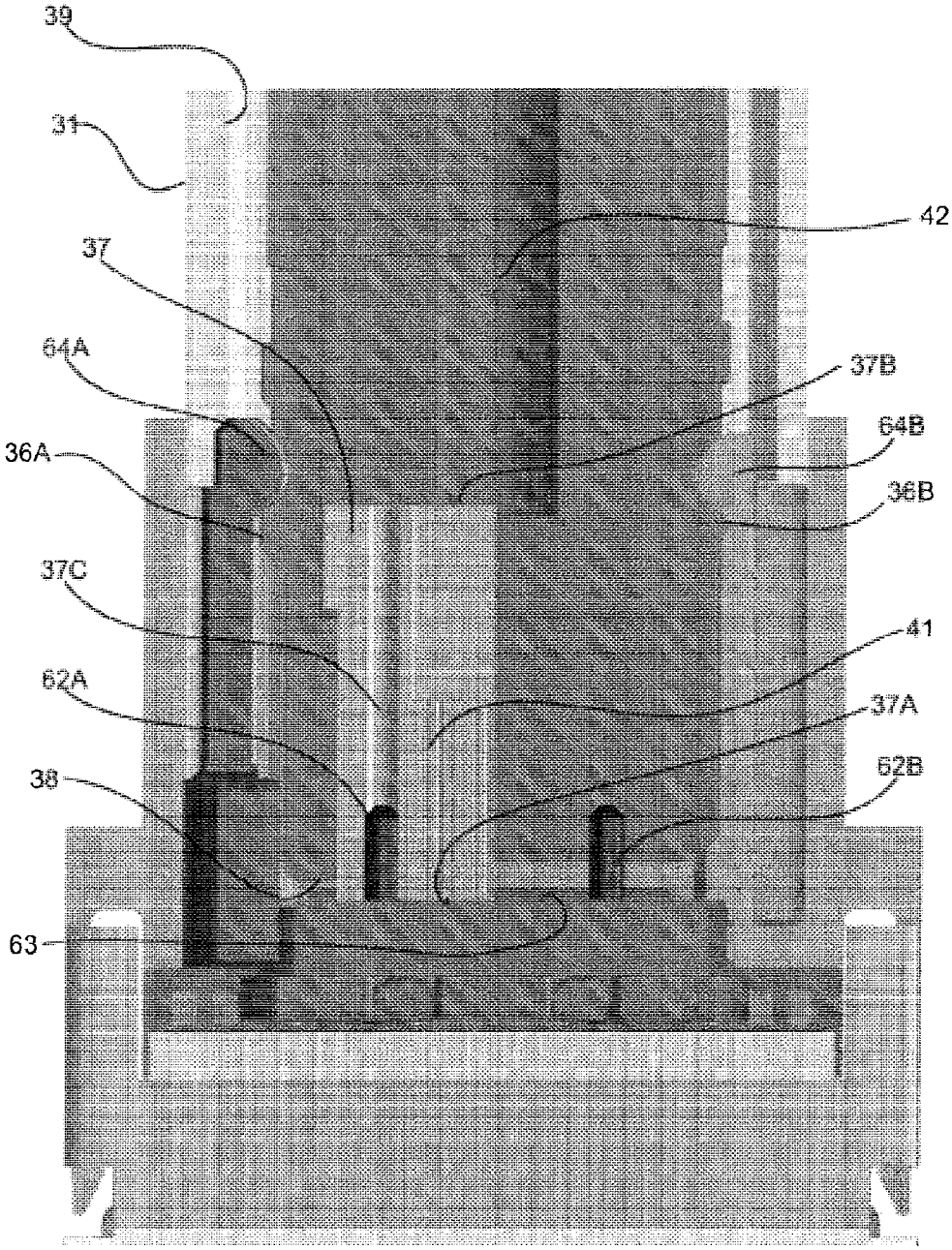
FIG. 2C (PRIOR ART)
FIG. 2C illustrates a 3-D close-up cutaway view of the MTP connector module shown in FIG. 2B with the connector module connected to the transceiver receptacle.

The optics system of the connector module is configured in such a way that some movement of the parts of the connector module can occur without resulting in optical losses. This feature of the invention allows more tolerance in manufacturing the connector module and in selecting the materials that are used for the parts. By providing more tolerance with respect to manufacturing and selecting materials for the parts, and by avoiding the use of polished fibers and the cost associated with the polishing process, the overall cost of the connector module can be kept relatively low in comparison to the cost of the known MTP connector module described above with reference to FIGS. 2A-2C. At the same time, the configuration of the connector module is such that wiggle loss and optical losses due to movements of parts are reduced or eliminated, thereby providing the connector module with very good performance.

Figure 4:
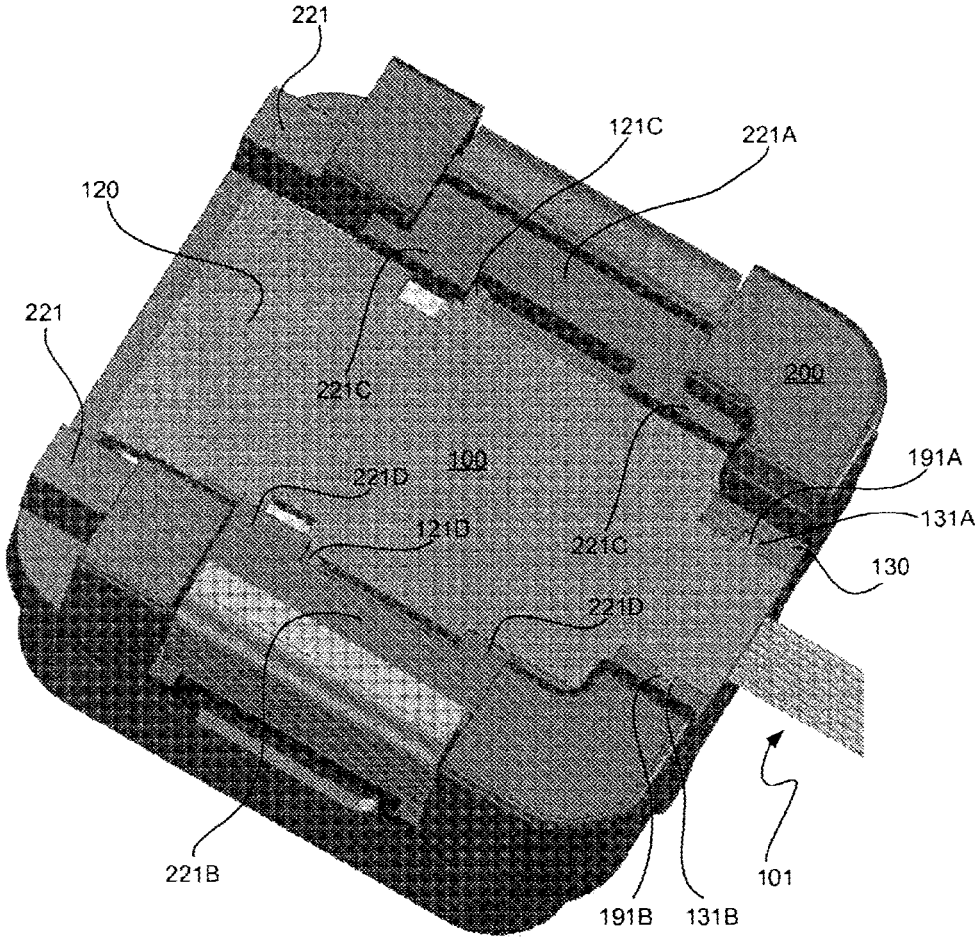
FIG. 4 illustrates a perspective top view of the connector module of the invention in accordance with an illustrative embodiment connected to a transceiver module that is suitable for use with the connector module.

FIG. 4 illustrates a top perspective view of the connector module 100 of the invention, in accordance with an illustrative embodiment, in locking engagement with a transceiver module 200. The connector module 100 holds the ends of a plurality of optical fibers of an optical fiber ribbon cable 101 and secures them in a way that provides strain relief from forces exerted on the fibers while optically aligning the fiber ends with an optics system (not shown) within the connector module 100. The transceiver module 200 has a sliding-lock mechanism 221 that includes a pair of side sliding members 221A and 221B that place a downward force on the connector module 100 that presses down on the connector module 100 and holds it in place in locking engagement with the transceiver module 200. Each of the side sliding members 221A and 221B has a pair of outwardly projecting tabs 221C and 221D, respectively, which engage a pair of outwardly projecting tabs 121C and 121D, respectively, on the connector module housing 120.

A strain relief device 130 of the connector module 100 is configured to tightly grip the optical fiber ribbon cable 101, and snaps onto the housing 120 of the connector module 100 via a keying arrangement comprising connecting devices 191A and 191B formed in the housing 120 of the connector module 100, which are received in respective slots 131A and 131B, respectively, formed in the strain relief device 130.

Figure 5:
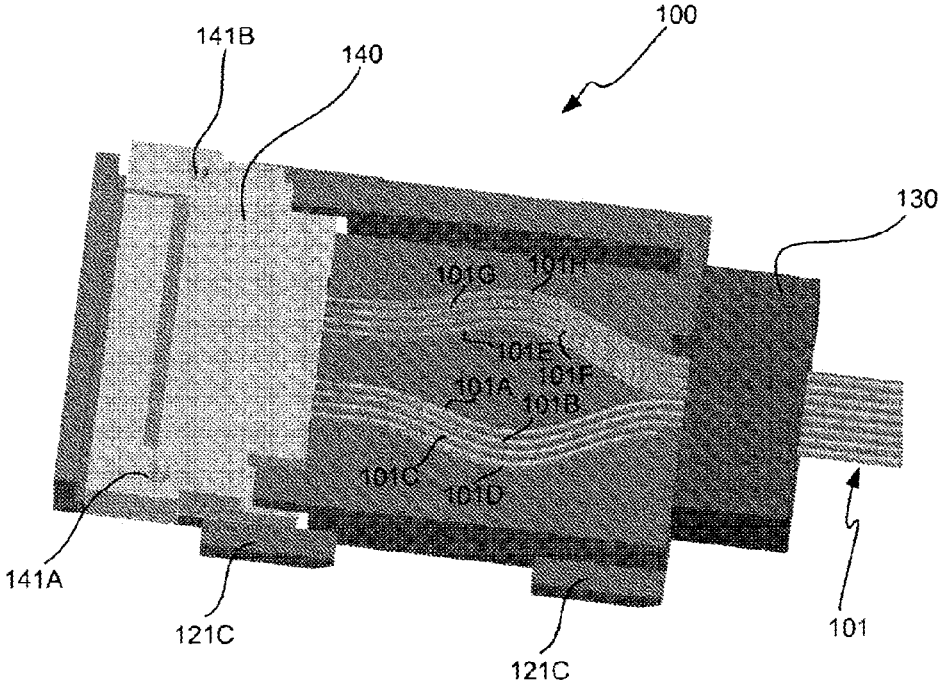
FIG. 5 illustrates a perspective bottom perspective view of the connector module shown in FIG. 4 disconnected from the transceiver module.

FIG. 5 illustrates a bottom perspective view of the connector module 100 shown in FIG. 4. The connector module 100 will typically be made of a molded plastic material of the same type as the molded plastic material of which the transceiver module 200 is made. In the illustrative embodiment being described herein, the connector and transceiver modules 100 and 200 are configured to use four transmit fibers 101A-101D and four receive fibers 101E-101H. Thus, the transceiver module 200 has four laser diodes that generate light and are amplitude modulated to transmit data over the respective transmit fibers 101A-101D. Similarly, the transceiver module 200 has four receive photodiodes that are used to receive light transmitted over the four respective receive fibers 101E-101H. Of course, the invention is not limited to this particular configuration for the transceiver and connector modules 100 and 200. The connector and transceiver modules 100 and 200 may be configured to use any number of transmit and/or receive fibers. Also, the connector and transceiver modules 100 and 200 may be configured to only use either transmit fibers or receive fibers, in which cases the transceiver module 200 is only functioning as either a transmitter module or as a receiver module.

The connector module 100 includes an optics system 140 in which the ends of the fibers 101A-101H are secured, as will be described below in more detail with reference to FIG. 6A-6D. The optics system 140 has a housing that is preferably made of a molded plastic material of the same type as the molded plastic material of which the connector module 100 is made. The housing of the optics system 140 has two cone-shaped openings 141A and 141B formed therein that are shaped to receive and mate with two cone-shaped protrusions (not shown) on the transceiver module housing in order to allow the connector module 100 having the optics system 140 attached thereto to be passively aligned with the transceiver module 200. This alignment ensures that the optics system (not shown) of the transceiver module 200 is optically aligned with the optics system 140 of the connector module 100. As will be described in detail below with reference to FIGS. 11 and 12, this alignment of the optics systems of the connector and transceiver modules 100 and 200 ensures that the ends of the fibers 101A-101D receive the light generated by the respective laser diodes of the transceiver module 200 and that the photodiodes of the transceiver module 200 receive light propagating out of the ends of the respective fibers 101E-101H.

Figure 6A:
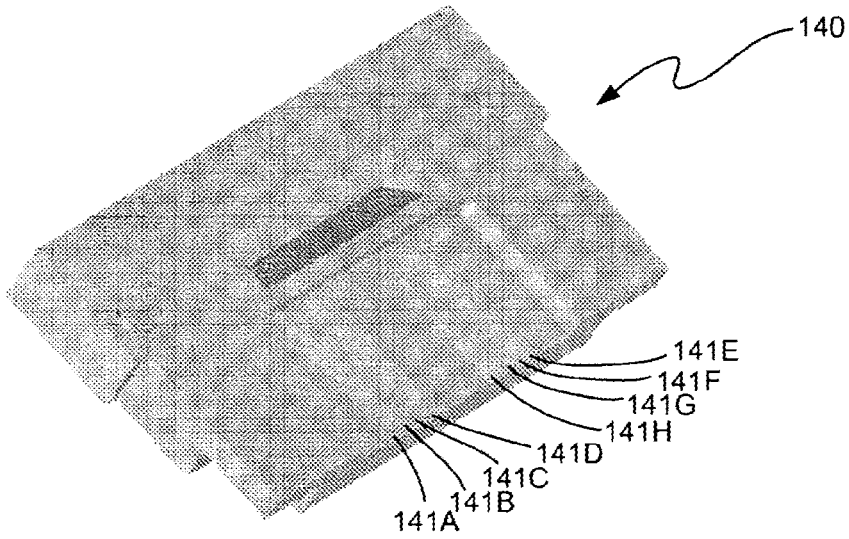
FIG. 6A illustrates a top perspective view of the optics system of the connector module shown in FIG. 5 before the ends of the fibers have been secured within the optics system of the connector module.

FIG. 6A illustrates a top perspective view of the optics system 140 of the connector module 100 before the ends of the fibers 101A-101H have been secured within the optics system 140. Prior to the fibers 101A-101H being secured within the optics system 140, the end portions of the fibers to be secured within the optics system 140 are stripped of the fiber jackets that surround the fiber claddings so that all that remains at the end portions of the fibers are the fiber cores surrounded by their respective claddings. The very ends of the fibers 101A-101H are cleaved and the end portions are placed in respective V-grooves 141A-141H formed in the optics system 140.

Figure 6B:
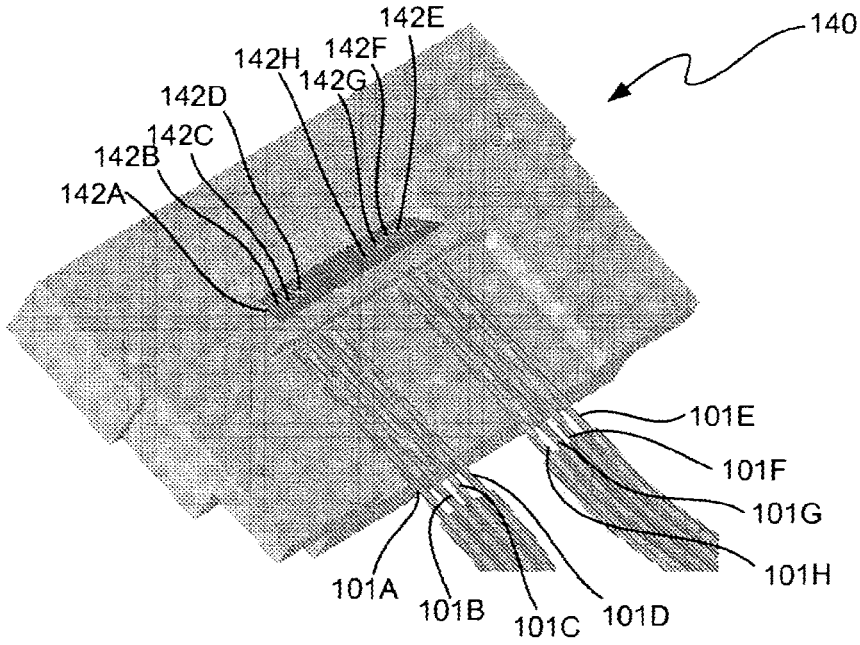
FIG. 6B illustrates a top perspective view of the optics system of the connector module shown in FIG. 5 after the ends of the fibers have been secured within the optics system of the connector module.

FIG. 6B illustrates a top perspective view of the optics system 140 of the connector module 100 after the ends of the fibers 101A-101H have been secured within the optics system 140. Lenses 142A-142D focus light from received from the laser diodes of the transceiver module 200 via the optics system (not shown) of the transceiver module 200 into the respective ends of the transmit fibers 101A-101D. Lenses 142E-142H focus light propagating out of the ends of the receive fibers 101E-101H onto the respective photodiodes of the transceiver module 200 via the optics system of the transceiver module 200.

Figure 6C:
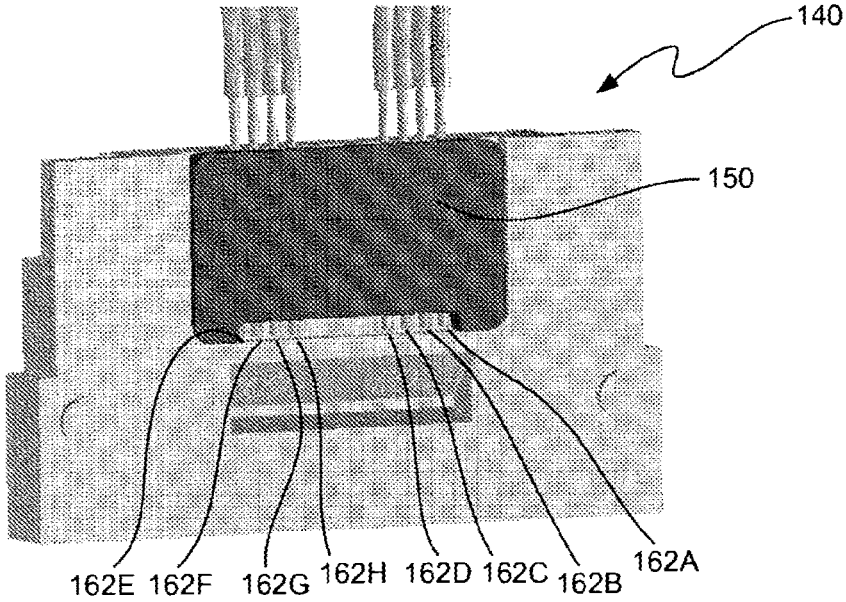
FIG. 6C illustrates a top perspective view of the optics system of the connector module shown in FIG. 5 having the ends of the fibers secured therein by a cover that has crushing features that are partially crushed by the end portions of the fibers when the cover is installed.

FIG. 6C illustrates a front perspective view of the optics system 140 of the connector module 100 having the ends of the fibers 101A-101H secured therein by a cover 150 that has crushing features (not shown) that are partially crushed (i.e., deformed) as they are pressed against the end portions of the fibers 101A-101H when the cover 150 is snapped onto the body of the optics system 140. These crushing features ensure that the end portions of the fibers 101A-101H are tightly located against the V-grooves 141A-141H and do not move after the cover 150 has been installed.

Figure 6D:
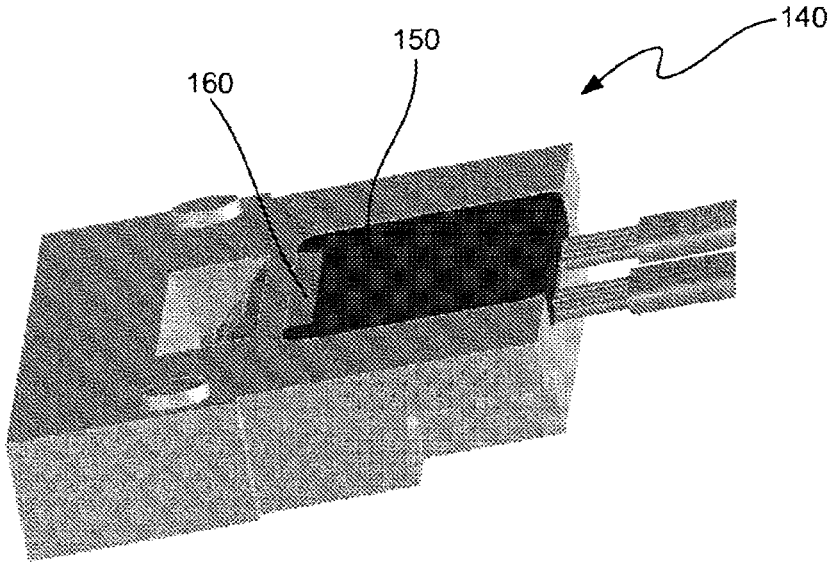
FIG. 6D illustrates a side perspective view of the optics system of the connector module shown in FIG. 5 having the ends of the fibers secured between the cover and the V-grooves and having an index-matching epoxy dispensed over the ends of the fibers.

FIG. 6D illustrates a side perspective view of the optics system 140 of the connector module 100 having the ends of the fibers 101A-101H secured between the cover 150 and the V-grooves 141A-141H and having an index-matching epoxy 160 dispensed over the ends of the fibers 101A-101H. The index-matching epoxy 160 bonds the end portions of the fibers 101A-101H to the cover 150 and provides optical coupling between the ends of the fibers 101A-101H and respective openings 162A-162H formed in of the optics system 140 for coupling light from the lenses 142A-142D onto the ends of the fibers 101A-101D and for coupling light from the ends of fibers 101E-101H onto the lenses 142E-142H. By cleaving the ends of the fibers 101A-101H and using the index-matching epoxy to provide optical coupling, the potential for misalignment to occur as a result of temperature changes is eliminated, or at least greatly reduced, due to the fact that the portion of the optics system 140 that holds the fibers 101A-101H is made of the same material as the portion of the optics system 140 in which the lenses 142A-142H are held. Because these portions are made of the same material (e.g., plastic), they have the same coefficients of thermal expansion (CTE) such a change in temperature that results in movement of one portion will result in movement of the other portion by the same amount and direction. As will be described below with reference to FIGS. 11 and 12, this feature of the invention in combination with the configuration and components of the optics system 140 will ensure that light from the laser will always be coupled from the lenses 142A-142D onto the ends of the fibers 101A-101D.

Figure 7:
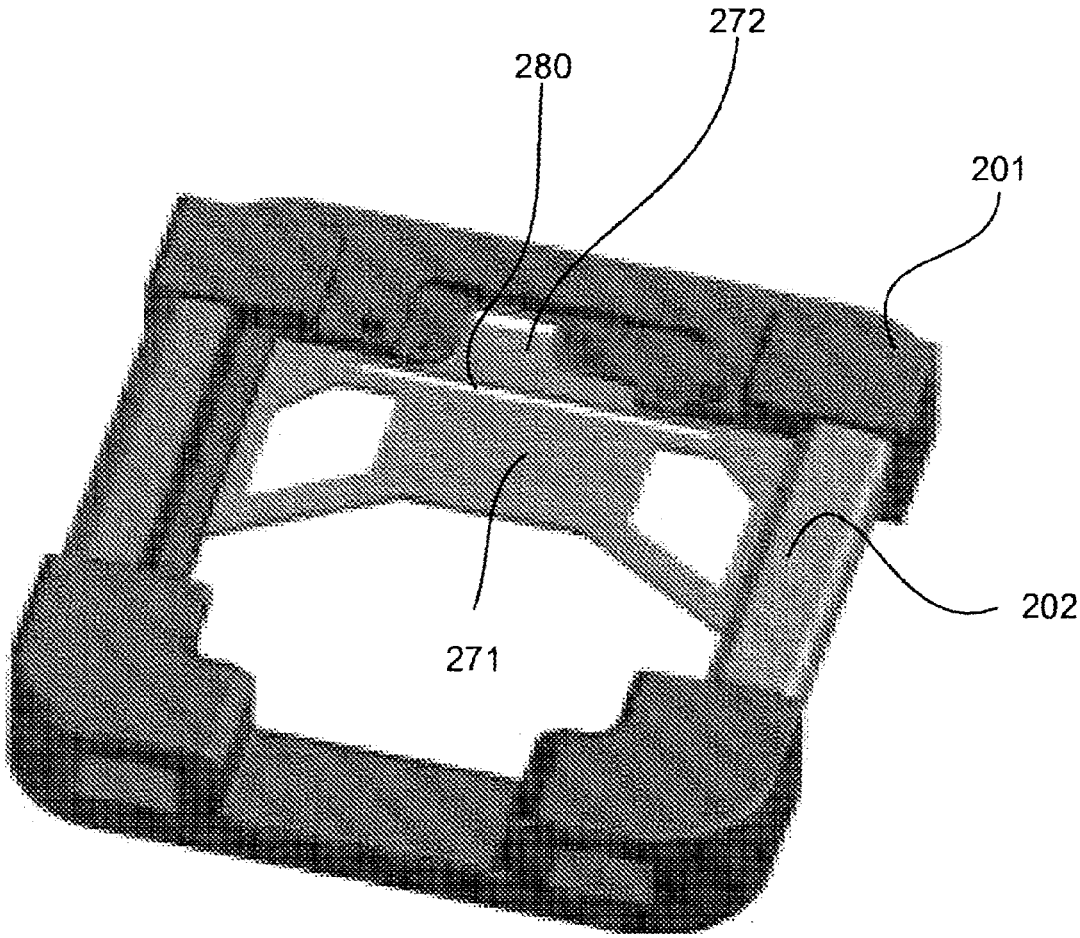
FIG. 7 illustrates a perspective top view of the molded housing of the transceiver module shown in FIG. 4 with the leadframe attached to it prior to the PCB and the ICs being mounted on the leadframe.
Figure 8:
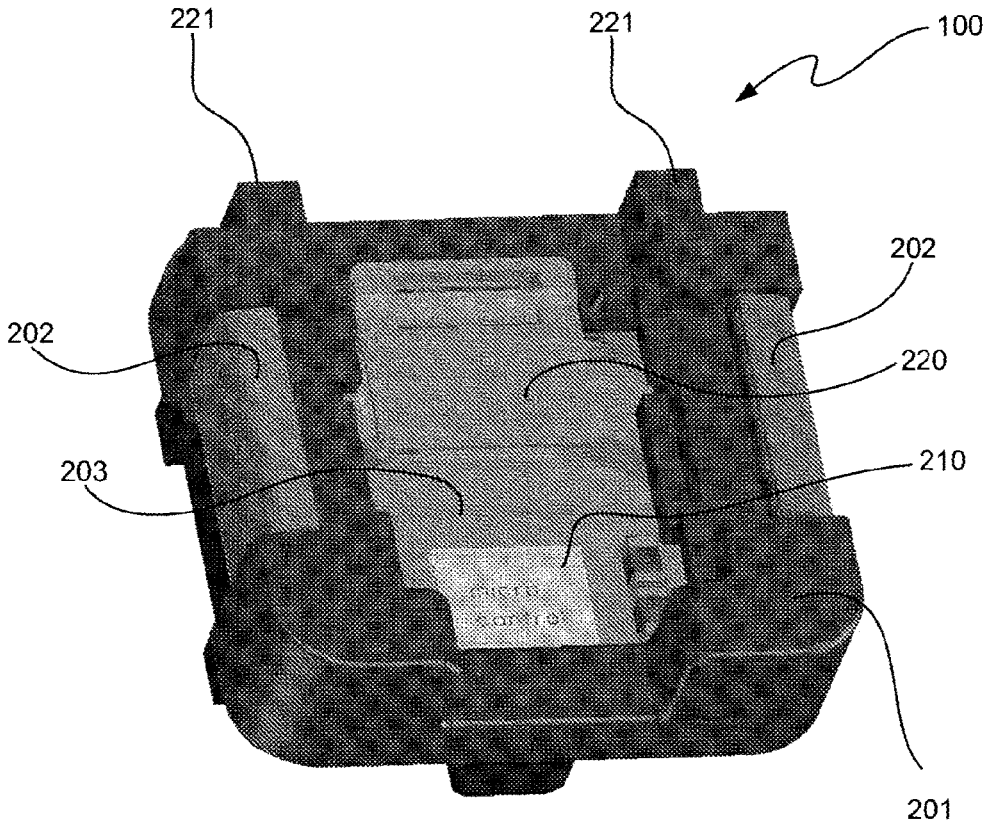
FIG. 8 illustrates a top perspective view of the transceiver module shown in FIG. 4 with the transceiver PCB attached to the leadframe, the ICs mounted on the PCB, and the transceiver optics system attached to the molded leadframe.
Figure 9:
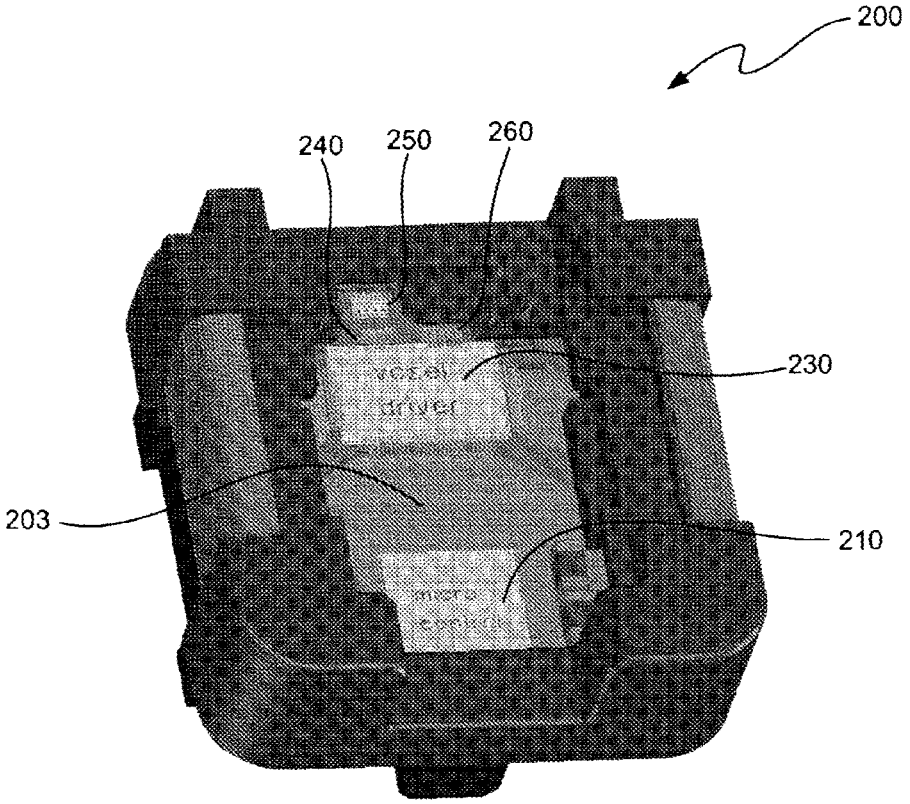
FIG. 9 illustrates a top perspective view of the transceiver module shown in FIG. 4 with the transceiver PCB attached to the leadframe and the ICs mounted on the PCB, prior to the transceiver optics system being attached to the molded leadframe.

FIGS. 7, 8 and 9 illustrate perspective top views of the transceiver module 200 in accordance with an illustrative embodiment. FIG. 7 shows only the molded leadframe 202. FIG. 8 shows the molded leadframe 202 having all of the other components of the transceiver module 200 attached thereto. FIG. 9 shows the molded leadframe 202 having all of the other components of the transceiver module 200 attached thereto except for the optics system 220. The portions 271 and 272 of the leadframe 202 (FIG. 7) are the die attach regions comprising the heat spreader device of the transceiver module 200. The VCSEL driver IC 230 (FIG. 8) is die attached to the upper surface of the portion 271 of the leadframe 202. The VCSEL IC 240, the photodiode monitor IC 250 and the receive photodiode IC 260 are die attached to respective locations on the upper surface of portion 272 of the leadframe 202. The PCB 203 is mounted to the bottom side of the leadframe 202 and the ICs are mounted to the top side of the leadframe 202 and wire bonded to the PCB 203. Heat generated by all of these ICs 230-260 is spread out over the leadframe 202 and dissipated.

Because the VCSEL driver IC 230 and the VCSEL IC 240 and receive photodiode IC 260 are mounted in such close proximity to one another, a slot 280 is formed in the leadframe 202 to create an air gap that thermally isolates the VCSEL driver IC 230 from the VCSEL IC 240 and the receive photodiode IC 260. The width of the slot is typically about 0.3 to 0.4 mm. However, the VCSEL driver IC 230 overhangs the slot 280 such that the air gap has a width that is typically about 0.1 to 0.2 mm. The slot 280 effectively prevents heat that flows from the VCSEL driver IC 230 into the portion 271 of the leadframe 202 from spreading to the portion 272 of the leadframe 202, and therefore thermally isolates the VCSEL IC 240 and the receive photodiode IC 260 from the VCSEL driver IC 230.

Some of the contact pads (not shown) of the ICs 230, 240, 250 and 260 are wire bonded to conductors of the PCB 203. Particular contact pads of the VCSEL driver IC 230 are directly wire bonded to particular contact pads of VCSEL IC 240. Likewise, particular contact pads of the VCSEL driver IC 230 are directly wire bonded to particular contact pads of the receive photodiode IC 260. The transceiver controller 210 is an IC that is also die attached to the PCB 203. The contact pads of the controller IC 210 are wire bonded to conductors of the PCB 203 to provide the electrical interconnections between the controller 210 and the ICs 230-260.

The direct wire bonds between pads of the VCSEL driver IC 230 and pads of the VCSEL IC 240 and receive photodiode IC 260 result in reduced lead lengths for these ICs. One of the important features of the invention is that the VCSEL driver IC 230 and the VCSEL IC 240 are in very close proximity to one another so that the wire bonds that form the leads that electrically interconnect pads of these two ICs are very short in length. Because the leads are very short in length, i.e., typically on the order of about 0.3 to 0.4 millimeters (mm) in length, they have very low inductances and thus do not degrade signal integrity or contribute appreciably to electromagnet interference (EMI). The same is true for the leads that interconnect the receive photodiode IC 160 and the VCSEL driver IC 230.

In order to allow these ICs to be placed in very close proximity to one another, it was necessary, or at least highly desirable, to thermally isolate the VCSEL IC 240 and the receive photodiode IC 260 from the VCSEL driver IC 230. As described above, the VCSEL driver IC generates a relatively large amount of heat, which can detrimentally affect the performance of the VCSEL IC. Likewise, the heat generated by the VCSEL driver IC 230 can detrimentally affect the performance of the receive photodiode IC 260. The manner in which the ICs 240 and 260 are thermally isolated from the VCSEL driver IC 230 will now be described with reference to FIG. 10.

Figure 10:
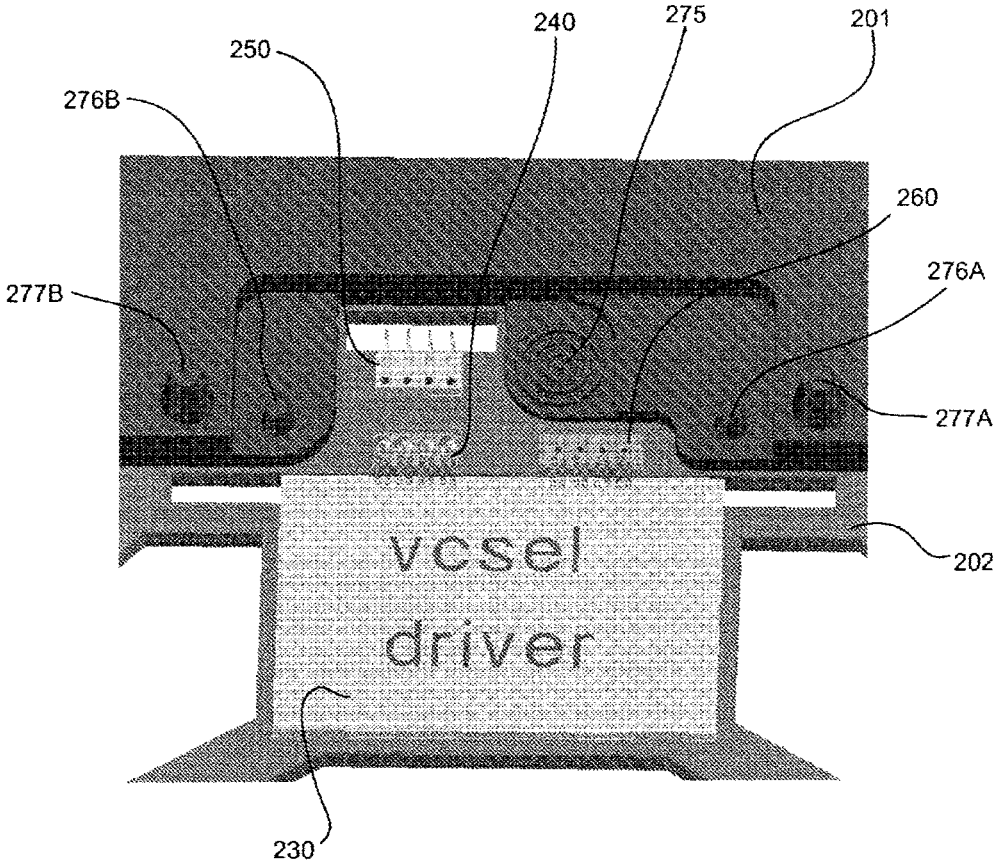
FIG. 10 illustrates a close-up front view of a portion of the molded leadframe assembly of the transceiver module, which shows the alignment devices of the molded leadframe used to align the transceiver optics system and the connector module optics system.

FIG. 10 illustrates a close-up front view of a portion of the molded leadframe assembly 290, which shows the ICs 230-260 attached to the leadframe 202 of the molded leadframe assembly. A reference device 275 made up of concentric rings is formed in the molded portion 201 of the molded leadframe assembly 290. The reference device 275 is used in active alignment process by a vision system (not shown) that optically aligns itself with the center of the reference device 275 and then uses that alignment to allow the assembly process to die attach the ICs 230-260 to the leadframe 202 at the proper locations and to perform the wire bonding process. Once the die attach and wire bonding processes have been performed, a passive alignment process is performed as part of the assembly process to attach the optics system 220 to the molded leadframe assembly 290. The molded leadframe assembly 290 has a pair of cone-shaped protrusions 276A and 276B that are shaped to engage the cone-shaped openings (not shown) formed in the housing of the optics system 220 of the transceiver module 200 when the protrusions 276A and 276B are in alignment with the openings. The assembly 290 has a pair of cone-shaped protrusions 277A and 277B that are shaped to engage the cone-shaped openings 141A and 141B formed in the housing 120 of the connector module 100 when the protrusions 277A and 277B are in alignment with the openings 141A and 141B.

It should be noted that, although the connector module 100 of the invention is intended for use with the transceiver module 200, the connector module 100 is not limited to being used with a transceiver module 200 having the features described herein. The transceiver module 200 is merely an example of one transceiver module design that is suitable for use with the connector module of the invention.

Figure 3:
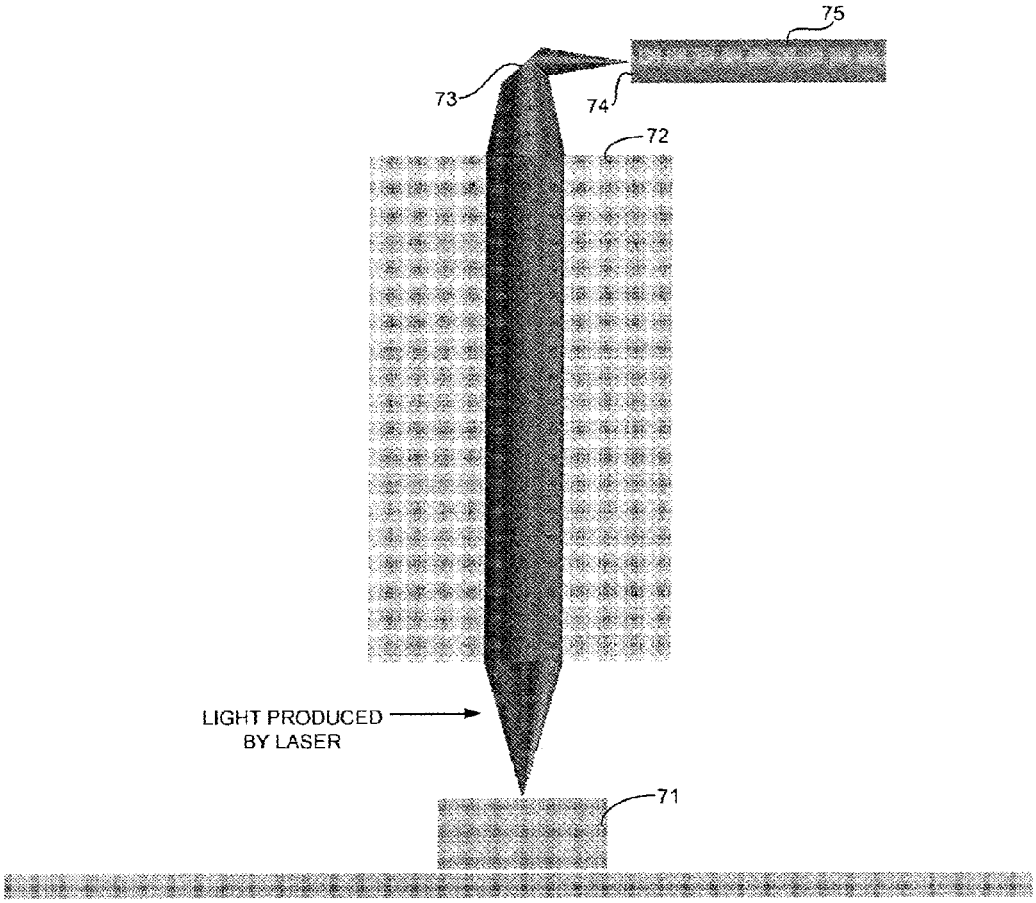
FIG. 3 (PRIOR ART)
FIG. 3 illustrates the optical path taken by light output from a VCSEL laser of a transceiver module (not shown) as the light passes through a known transceiver receptacle and is focused onto the end of a transmit fiber held in a known PT connector module.

One of the key features of the invention that is different from the known PT connector module described above is that the optical input to the connector module 100 from the transceiver module 200 is a collimated beam of light. In the known PT connector module described above with reference to FIG. 3, the optical input to the connector module from the transceiver module is a focused beam of light that is focused by the lens 72 onto the folding mirror 73, which reflects the beam such that the focal point of the beam coincides with the end of the fiber 75. With this type of arrangement, the tolerances for selecting materials and manufacturing the modules are very low because even small movements of the parts can result in a variation in the optical path that will prevent the focal point of the light beam from coinciding with the end of the fiber 75, which of course will result in optical losses.

In contrast, in accordance with the invention, the optical inputs from the lasers of the transceiver module to the connector module are collimated light beams. The collimated beams output by the respective big-eye lenses disposed over the lasers can move without resulting in optical losses as long as the collimated beams are fully received by the respective lenses 142A-142D. For example, assuming the lenses 142A-142D are each ten micrometers in diameter larger than the collimated beams, the collimated beams can move in any direction by five micrometers and still fall fully on the respective lenses 142A-142D. Thus, even if the CTE of the lasers is different from the CTE of the connector module material in which the lenses 142A-142D are held, relative movement of these components will not result in optical losses as long as the diameters of the lenses 142A-142D is significantly larger than the diameters of the collimated beams. This feature of the invention allows materials to be selected and the parts to be manufactured with greater tolerance because lower precision alignment is needed to ensure that optical losses do not occur in comparison with the known MTP and PT connector modules.

In addition, as stated above, the lenses 142A-142D and the fibers 142A-142D are in the same material of the optics system 140. This means that the lenses 142A-142D and the fibers 101A-101D will move by the same amounts and in the same directions if connector module portions in which they are held expand or contract due to temperature variations. In other words, because these portions have the same CTE, the lenses 142A-142D and the ends of the fibers 101A-101D will always remain in optical alignment with each other even if the module portions in which they are held expand or contract. This is more important for the transmit side than for the receive side due to the fact that the apertures of the lasers (240) are smaller than the apertures of the receive photodiodes (260). Nevertheless, for the same reasons described above, it is also true that the lenses 142E-142H and the ends of the fibers 101E-101H will always remain in optical alignment with each other.

Figure 11:
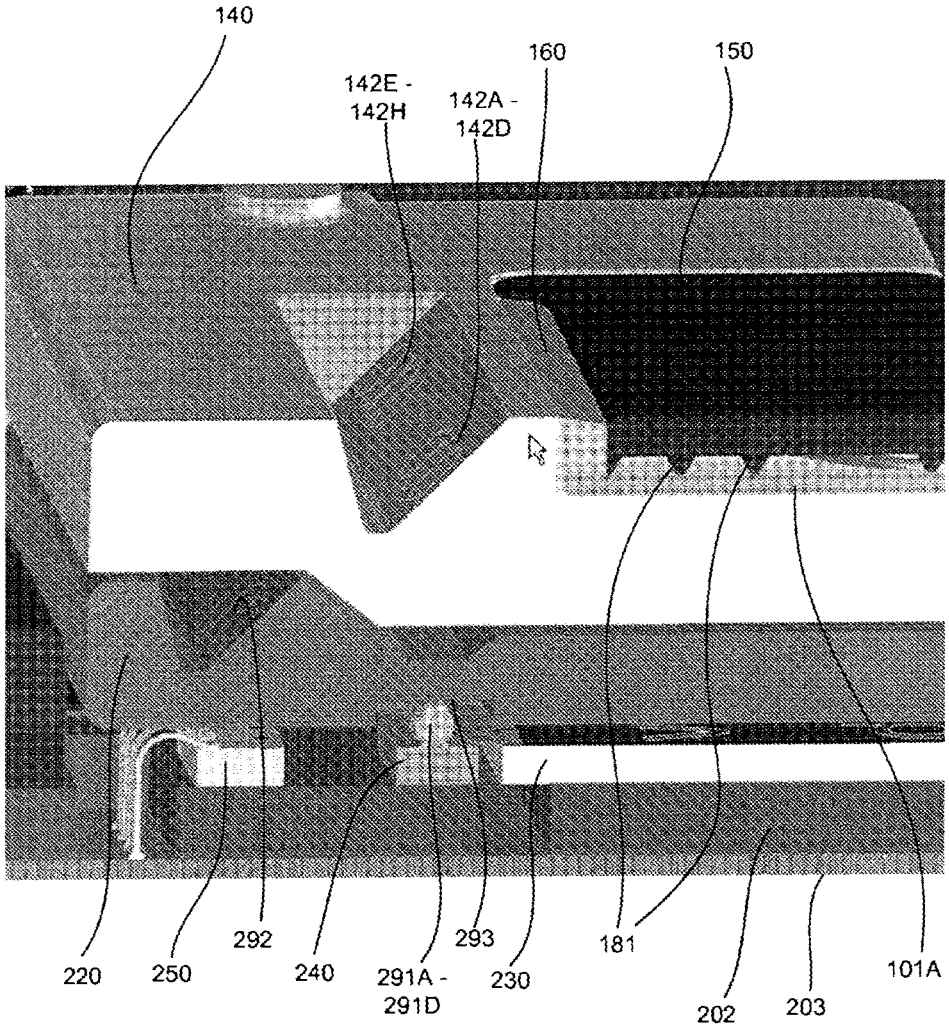
FIG. 11 illustrates a cross-sectional left side perspective view of the connector module in locking engagement with the transceiver module, which shows the optical coupling provided by the optics system of the connector module and the optics system of the transceiver module.

FIG. 11 illustrates a cross-sectional left side perspective view of the connector module 100 in locking engagement with the transceiver module 200, which shows the optical coupling provided by the optics system 220 of the transceiver module 200 and the optics system 140 of the connector module 100. On the VCSEL IC 240, four big-eye lenses 291A-291D are disposed above the four respective VCSEL laser diodes (not shown) of the IC 240. The lenses 291A-291D collimate light generated by the laser diodes and direct the collimated light beams onto a grating element 293. The grating element 293 passes most of the light of the collimated light beams to the lenses 142A-142D of the connector module optics system 140, but redirects some of the light onto focusing reflective lenses 292. The lenses 292 focus the light onto the photodiodes of the monitor photodiode IC 250. Lenses 142A-142D receive the collimated light beams and focus them onto the ends of the transmit fibers 101A-101D.

Protrusions 181 formed on the cover 150 correspond to the crushing features described above, which press against the fibers when the cover 150 is snapped in place to help ensure that the fiber ends do not move relative to the optics system 140 of the connector module 100. The protrusions 181 slightly deform when they are pressed against the fibers to tightly locate the fibers against the V-grooves formed in the cover 150. The index matching epoxy 160 secures the fibers to the base of the optics system and to the cover 150. The epoxy 160 ensures that light focused by the lenses 142A-142D will not diverge as it propagates between the lenses 142A-142D and the ends of the fibers 101A-101D.

In the receive side, light propagating out of the ends of the receive fibers 101E-101H is focused by the lenses 142E-142H onto an optical element (not shown) of the optics system 220 of the transceiver module 200, which directs the light onto the photodiodes of the receive photodiode IC 260. The epoxy 160 ensures that light will not diverge between the ends of the fibers 101E-101H and the lenses 142E-142H.

Figure 12:
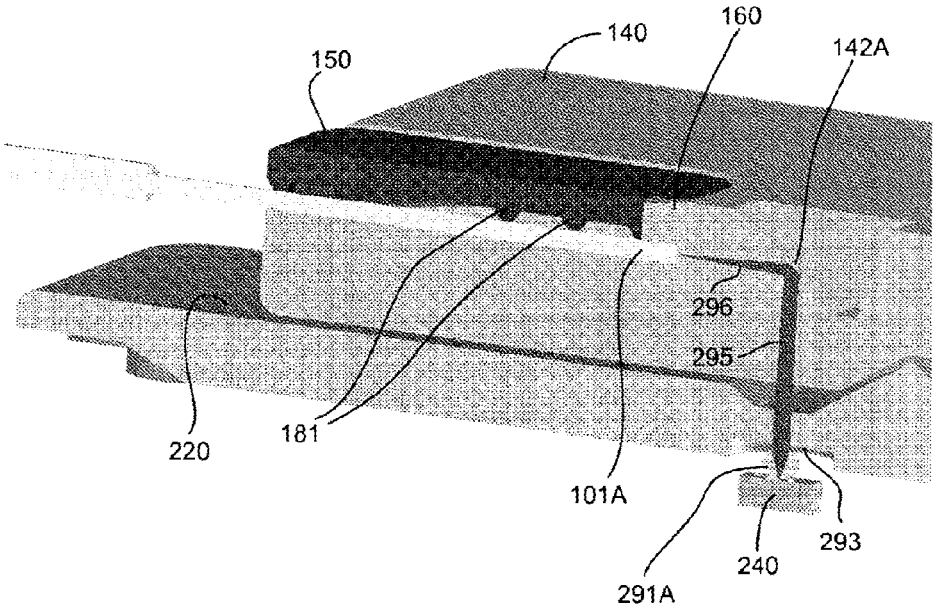
FIG. 12 illustrates a cross-sectional right side perspective view of the connector module in locking engagement with the transceiver module, which shows the optical coupling provided by the optics system of the transceiver module and the optics system of the connector module.

FIG. 12 illustrates a cross-sectional right side perspective view of the connector module 100 in locking engagement with the transceiver module 200, which shows the optical coupling provided by the optics system 140 of the connector module 100 and the optics system 220 of the transceiver module 200 on the transmit side for a single transmit fiber 101A. The light generated by the laser diode of the laser diode IC 240 is collimated by the big-eye lens 291A into a collimated light beam 295 and directs the collimated beam onto the grating element 293. As described above, the grating element 293 allows most of the collimated light beam onto the focusing lens 142A, but redirects some of the light onto the monitor photo diodes (not shown). Lens 142A converts the collimated light beam 295 into a focused light beam 296 and focuses it onto the end of the optical fiber 101A. The collimated light beam 295 is typically on the order of 100 micrometers in diameter, which is substantially smaller that the surface area of the lens 142A that collects the beam. The surface area of the lens 142A that collects the collimated light beam and focuses it on the end of the fiber 101A is typically on the order of 200 microns, although it is not limited to this dimension. Thus, even if there are movements of one or more of the parts of the connector module 100 and/or of the transceiver module 200, as long as the movements are not so great as to prevent the collimated beam 295 from projecting fully onto the lens 142A, the focused light beam 296 will be focused into the end of the fiber 101A and there will not be any optical losses due to misalignment.

It should be noted that the invention has been described with respect to illustrative embodiments for the purpose of describing the principles and concepts of the invention. The invention is not limited to these embodiments. For example, while the invention has been described with reference to using particular optical components to control the optical path between the transceiver and connector modules, the invention is not limited to these components or to the overall configuration of the optical path. As will be understood by those skilled in the art in view of the description being provided herein, modifications may be made to the embodiments described to provide a system that achieves the goal of the invention, and all such modifications are within the scope of the invention.

What is claimed is:

1. A multi-optical fiber connector module comprising:

a connector module housing having one or more locking mechanisms configured to interlock with one or more locking mechanisms of a transceiver module housing to place the connector module in locking engagement with a transceiver module; and an optics system having one or more optical components configured to receive a plurality of light beams from a transceiver module when the connector module is in locking engagement with a transceiver module, each of the received light beams being at least substantially collimated, said one or more optical components focusing each of the substantially collimated light beams onto a respective end face of a respective end of one of a plurality of transmit optical fibers, wherein the respective ends of the transmit optical fibers are cleaved and the respective end faces are left in as-cleaved conditions such that each respective end face has a roughness and angle relative to a longitudinal axes of the respective transmit optical fiber that occurs when the respective ends are cleaved, and wherein the ends of the transmit optical fibers are secured to the optics system of the connector module; and an epoxy material covering the end faces, the epoxy material having a refractive index that at least substantially matches a refractive index of the transmit optical fibers.

2. The multi-optical fiber connector module of claim 1, further comprising:

a strain relief mechanism configured to provide strain relief to the ends of the optical fibers from forces exerted on the fibers external to the connector module housing.

3. The multi-optical fiber connector module of claim 1, further comprising:

one or more passive alignment mechanisms configured to mate with one or more passive alignment mechanisms of a transceiver module such that when the connector module is in locking engagement with a transceiver module, said one or more passive alignment mechanisms of the connector module are mated with said one or more passive alignment mechanisms of the transceiver module and the optics system of the connector module is optically aligned with an optics system of the transceiver module.

4. The multi-optical fiber connector module of claim 1, further comprising:

a plurality of V-grooves formed in a base of the optics system of the connector module, each of the ends of the optical fibers being disposed a respective V-groove; and a cover configured to connect to the base of the optics system, the cover having one or more protrusions on an inner surface thereof that press against the fibers when the cover is connected to the base of the optics system of the connector module.

5. The multi-optical fiber connector module of claim 1, wherein said one or more optical components of the optics system of the connector module are respective focusing lenses secured in the optics system, each lens receiving a respective one of the substantially collimated light beams, each respective lens focusing a respective one of the substantially collimated light beams to a respective focal point that corresponds with a respective end face of a respective end of a respective optical fiber.

6. The multi-optical fiber connector module of claim 1, wherein the optics system of the connector module further comprises:

one or more optical components configured to receive light from one or more receive optical fibers and to focus the received light onto one or more respective receive photodiodes of a transceiver module connected in locking engagement with the connector module.

7. The multi-optical fiber connector module of claim 6, wherein said one or more optical components configured to receive and focus light from one or more receive optical fibers are respective focusing lenses.

8. The multi-optical fiber connector module of claim 1, wherein said one or more locking mechanisms of the connector module housing are configured to slidingly engage said one or more locking mechanisms of the transceiver module housing to interlock the connector module in locking engagement with the transceiver module,

9. The multi-optical fiber connector module of claim 5, wherein the portion of the optics system of the connector module in which the lenses are secured has a coefficient of thermal expansion (CTE) that is at least substantially identical to a CTE of the portion of the optics system of the connector module to which the ends of the optical fibers are secured.

10. The multi-optical fiber connector module of claim 3, wherein said one or more passive alignment mechanisms of the connector module are two cone-shaped openings formed in the optics system of the connector module, the two cone-shaped openings formed in the optics system being shaped and sized to receive two cone-shaped protrusions located on a transceiver module housing, the two cone-shaped protrusions corresponding to said one or more passive alignment mechanisms of a transceiver module.

11. A method for coupling light beams output from a transceiver module that are at least substantially collimated onto end faces of ends of optical fibers secured to an optics system of a multi-optical fiber connector module, the method comprising:

in an optics system of a multi-optical fiber connector module, receiving the substantially collimated light beams with one or more optical components of the optics system of the multi-optical fiber connector module; and with said one or more optical components of the optics system of the multi-optical fiber connector module, focusing each respective one of the substantially collimated light beams to focal points on the respective end faces of the respective ends of the respective transmit optical fibers, wherein the ends of the fibers are cleaved and left in as-cleaved conditions such that each respective end face has a roughness and angle relative to a longitudinal axes of the respective transmit optical fiber that result when the respective ends are cleaved, and wherein the ends of the transmit optical fibers are secured to the optics system of the connector module, and wherein an epoxy material covers the end faces, the epoxy material having a refractive index that at least substantially matches a refractive index of the transmit optical fibers.

12. The method of claim 11, wherein the transmit fibers are restrained by a strain relief mechanism that is configured to provide strain relief to the ends of the optical fibers from forces exerted on the fibers external to the connector module housing.

13. The method of claim 11, wherein the connector module includes one or more passive alignment mechanisms configured to mate with one or more passive alignment mechanisms of a transceiver module such that when the connector module is in locking engagement with a transceiver module, said one or more passive alignment mechanisms of the connector module are mated with said one or more passive alignment mechanisms of the transceiver module and the optics system of the connector module is optically aligned with an optics system of the transceiver module.

14. The method of claim 11, wherein a plurality of V-grooves formed in a base of the optics system of the connector module, and wherein the ends of the transmit optical fibers are disposed in respective V-grooves, and wherein a cover is connected to the base of the optics system, the cover having one or more protrusions on an inner surface thereof that press against the transmit fibers when the cover is connected to the base of the optics system of the connector module.

15. The method of claim 11, wherein said one or more optical components of the optics system of the connector module are respective focusing lenses secured in the optics system, each lens receiving a respective one of the substantially collimated light beams, each respective lens focusing a respective one of the substantially collimated light beams to a respective focal point on a respective one of the end faces of a respective one of the transmit optical fibers.

16. The method of claim 11, wherein the optics system of the connector module further comprises:

one or more optical components configured to receive light from one or more receive optical fibers and to focus the received light onto one or more respective receive photodiodes of a transceiver module connected in locking engagement with the connector module.

17. The method of claim 16, wherein the portion of the optics system of the connector module in which the lenses are secured has a coefficient of thermal expansion (CTE) that is at least substantially identical to a CTE of the portion of the optics system of the connector module to which the ends of the optical fibers are secured.

*18. The multi-optical fiber connector module of claim 1, wherein the optics system includes a front end, a back end configured to receive the plurality of optical fibers and a recess disposed between the front end and the back end.*

*19. The multi-optical fiber connector module of claim 18, wherein the front end is substantially trapezoidal.*

*20. The multi-optical fiber connector module of claim 18, wherein the recess is substantially wedge-shaped.*

*21. The multi-optical fiber connector module of claim 18, wherein at least one opening is disposed at an upper surface of the back end to allow access to the plurality of optical fibers.*

*22. The multi-optical fiber connector module of claim 21, wherein a top cover is configured to be applied to the at least one opening, the cover having one or more protrusions on an inner surface thereof that are configured to restrict movement of the optical fibers when the cover is connected to the optics system of the connector module.*

*23. The multi-optical fiber connector module of claim 18, wherein the recess is configured to house the one or more optical components.*

*24. The multi-optical fiber connector module of claim 23, wherein the one or more optical components are a plurality of lenses.*

*25. The multi-optical fiber connector module of claim 24, wherein the plurality of lenses are arranged in a row.*

*26. The multi-optical fiber connector module of claim 1, wherein the optics system is in optical communication with the transceiver module.*

*27. The multi-optical fiber connector module of claim 1, wherein a lower surface of the optics system includes at least one opening configured to engage with the transceiver module.*

*28. The multi-optical fiber connector module of claim 1, wherein a surface area of at least one of the collimated light beams is smaller than a surface area of an optical component that collects the collimated light beams.*

*29. The multi-optical fiber connector module of claim 1, wherein a portion of the collimated light beams is redirected to at least one reflective lens in a feedback mechanism configured to maintain a target output power of a plurality of laser diodes disposed within the transceiver module.*

*30. The multi-optical fiber connector module of claim 1, wherein a portion of the collimated light beams is redirected to at least one reflective lens in a feedback mechanism configured to maintain an average output power of a plurality of laser diodes disposed within the transceiver module.*

*31. The multi-optical fiber connector module of claim 1, further comprising a grating element configured to pass the collimated light beams to the one or more optical components or to redirect a portion of the collimated lights beam to at least one reflective lens, the at least one reflective lens configured to focus the collimated light beams and to pass the collimated light beams to a photodiode of the transceiver module.*

*32. The multi-optical fiber connector module of claim 1, wherein the transceiver module includes a laser diode and one or more optical components configured to receive a plurality of light beams from the laser diode and substantially collimate the light beams.*

*33. The multi-optical fiber connector module of claim 32, wherein the one or more optical components are a plurality of ball lenses.*

* * * * *